United States Patent
Wu et al.

(10) Patent No.: US 11,223,816 B2
(45) Date of Patent: Jan. 11, 2022

(54) MULTI-IMAGE PROJECTOR AND ELECTRONIC DEVICE HAVING MULTI-IMAGE PROJECTOR

(71) Applicant: HIMAX TECHNOLOGIES LIMITED, Tainan (TW)

(72) Inventors: Biing-Seng Wu, Tainan (TW); Han-Yi Kuo, Tainan (TW); Bo-Han Lyu, Tainan (TW); Yin-Dong Lu, Tainan (TW); Kuan-Ming Chen, Tainan (TW); Meng-Ko Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 569 days.

(21) Appl. No.: 16/142,003

(22) Filed: Sep. 26, 2018

(65) Prior Publication Data
US 2020/0099919 A1  Mar. 26, 2020

(51) Int. Cl.
*H04N 13/254* (2018.01)
*G06T 7/521* (2017.01)
*G02B 27/42* (2006.01)

(52) U.S. Cl.
CPC ....... *H04N 13/254* (2018.05); *G02B 27/4233* (2013.01); *G06T 7/521* (2017.01); *G06T 2207/10028* (2013.01)

(58) Field of Classification Search
CPC .............. G02B 27/4233; G06T 7/521; G06T 2207/10028
USPC ........................................................... 353/38
See application file for complete search history.

(56) References Cited

U.S. PATENT DOCUMENTS

| | | |
|---|---|---|
| 2010/0008588 A1 | 1/2010 | Feldkhun |
| 2013/0038881 A1* | 2/2013 | Pesach ............... G01B 11/2513 |
| | | 356/610 |
| 2016/0377414 A1 | 12/2016 | Thuries |
| 2017/0156192 A1* | 6/2017 | Chern ....................... F21V 5/04 |
| 2018/0184056 A1 | 6/2018 | Kawai |

FOREIGN PATENT DOCUMENTS

| | | |
|---|---|---|
| CN | 108332082 A | 7/2018 |
| CN | 108490637 A | 9/2018 |
| CN | 108508621 A | 9/2018 |
| EP | 2 363 686 A1 | 9/2011 |
| EP | 3 112 923 A1 | 1/2017 |

(Continued)

*Primary Examiner* — Jerry L Brooks
(74) *Attorney, Agent, or Firm* — Winston Hsu

(57) ABSTRACT

The present invention provides a projector including a laser module and a lens module, wherein the lens module includes a plurality of lens and a plurality of diffractive optical elements. In the operations of the projector, the laser module is arranged to generate at least one laser beam; each of the lenses is arranged to receive one of the at least one laser beam to generate a collimated laser beam; and the diffractive optical elements correspond to the lenses, respectively, and each of the diffractive optical elements is arranged to receive the collimated laser beam from the corresponding lens to generate an image. The images generated by the diffractive optical elements form a projected image of the projector. By using the projector of the present invention, the projected image may have higher resolution or field of view that is advantageous for the 3D sensing system.

14 Claims, 8 Drawing Sheets

(56) References Cited

FOREIGN PATENT DOCUMENTS

| | | |
|---|---|---|
| JP | 2013-29795 A | 2/2013 |
| JP | 2014-164108 A | 9/2014 |
| JP | 2015-81953 A | 4/2015 |
| JP | 2015-167077 A | 9/2015 |
| JP | 2015-537228 A | 12/2015 |
| JP | 2016-166811 A | 9/2016 |
| JP | WO2017/038203 A1 | 7/2018 |
| TW | M526763 U | 8/2016 |
| WO | 2014/102341 A1 | 7/2014 |
| WO | 2018/056199 A1 | 3/2018 |

\* cited by examiner (a)

(b)

MULTI-IMAGE PROJECTOR AND ELECTRONIC DEVICE HAVING MULTI-IMAGE PROJECTOR

BACKGROUND OF THE INVENTION

1. Field of the Invention

The present invention relates to a projector, and more particularly, to a multi-image projector applied in a 3D sensing system.

2. Description of the Prior Art

In order to obtain 3D images, an electronic device may use a projector for projecting a special pattern to a surrounding region, and use camera to capture the image having the special pattern, and the captured image is analyzed by a processor to obtain the depth information of the image. The conventional projector has a fixed focal length and a fixed field of view (FOV), so if the special pattern is projected to an object that is far away from the projector or too close to the projector, a resolution of the special pattern may be worsened and the depth information may not be accurately determined.

SUMMARY OF THE INVENTION

It is therefore an objective of the present invention to provide a projector, which can generate the appropriate projected image to the surrounding region based on the working distance of the projector, to solve the above-mentioned problems.

According to one embodiment of the present invention, a projector including a laser module and a lens module is provided, wherein the lens module includes a plurality of lens and a plurality of diffractive optical elements. In the operations of the projector, the laser module is arranged to generate at least one laser beam; each of the lenses is arranged to receive one of the at least one laser beam to generate a collimated laser beam; and the diffractive optical elements correspond to the lenses, respectively, and each of the diffractive optical elements is arranged to receive the collimated laser beam from the corresponding lens to generate an image.

According to another embodiment of the present invention, an electronic device is provided, wherein the electronic device includes a projector, a camera module and a processor. In the operations of the electronic device, the projector is arranged to generate a projected image to a surrounding environment, the camera module is arranged to capture a region of the surrounding environment to generate image data, and the processor is arranged to analyze the image data to obtain depth information of the image data. In one embodiment, the projector includes a laser module and a lens module, wherein the lens module includes a plurality of lens and a plurality of diffractive optical elements. In the operations of the projector, the laser module is arranged to generate at least one laser beam; each of the lenses is arranged to receive one of the at least one laser beam to generate a collimated laser beam; and the diffractive optical elements correspond to the lenses, respectively, and each of the diffractive optical elements is arranged to receive the collimated laser beam from the corresponding lens to generate an image. The images generated by the diffractive optical elements form the projected image of the projector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
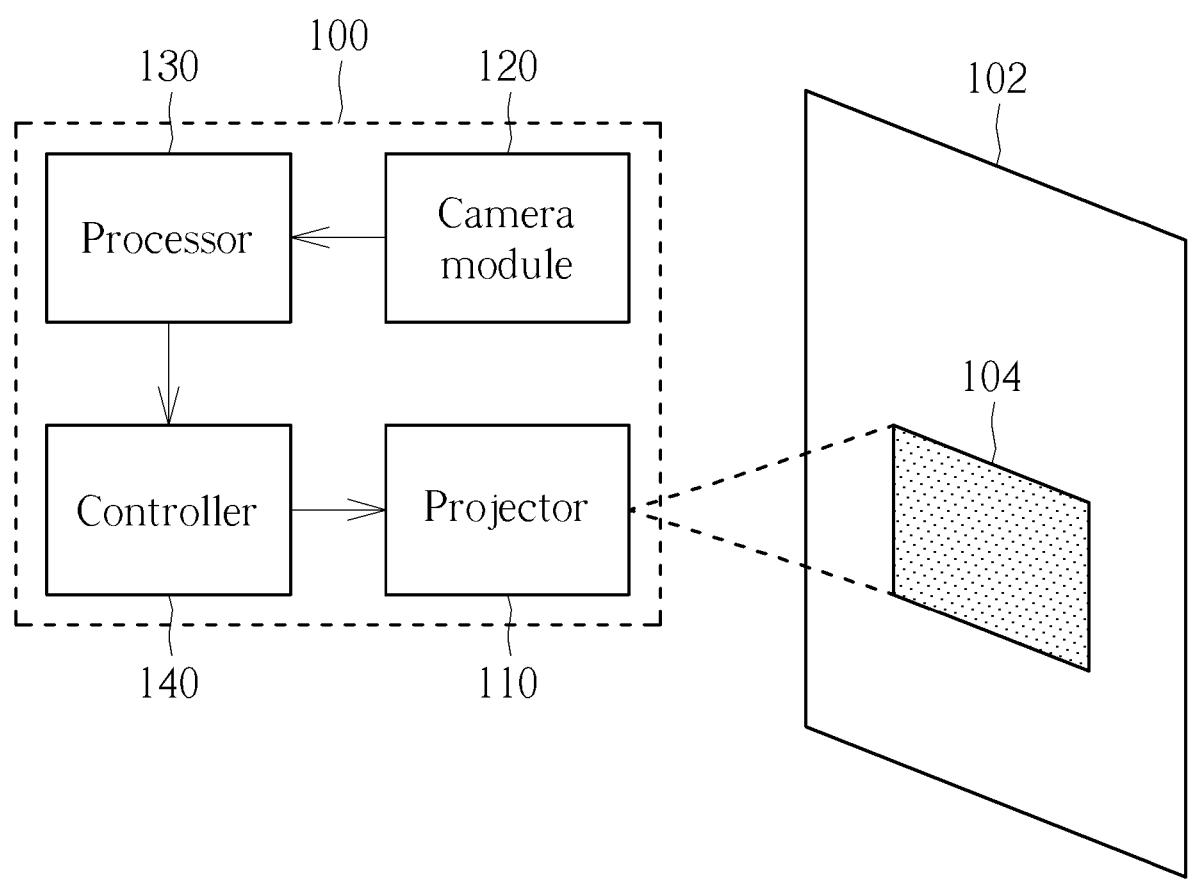
FIG. 1 is a diagram illustrating an electronic device according to one embodiment of the present invention.

FIG. 1 is a diagram illustrating an electronic device 100 according to one embodiment of the present invention. As shown in FIG. 1, the electronic device 100 comprises a projector 110, a camera module 120, a processor 130 and a controller 140. In this embodiment, the electronic device 100 may be a smart phone or a pad or any other portable device capable of generating 3D images.

In the operation of the electronic device 100, when the electronic device 100 prepares to capture a 3D image of an object 102, firstly, the processor 130 notifies the controller 140, and the controller 140 controls the projector 110 to generate a projected image 104 to the object 102. Then, the camera module 120 captures the projected image 104 with the object 102 to generate image data. Then the processor 130 analyzes the image data to obtain the depth information of the image data to generate the 3D image. As mentioned in the background of the invention, the resolution of the projected image 104 may be worsened if the object 102 is far away from the projector 110 or the object 102 is too close to the projector 110. Therefore, the embodiments of the present invention provide some designs of the projector 110 to make the projected image 104 on the object 102 have the better resolution or FOV.

Figure 2:
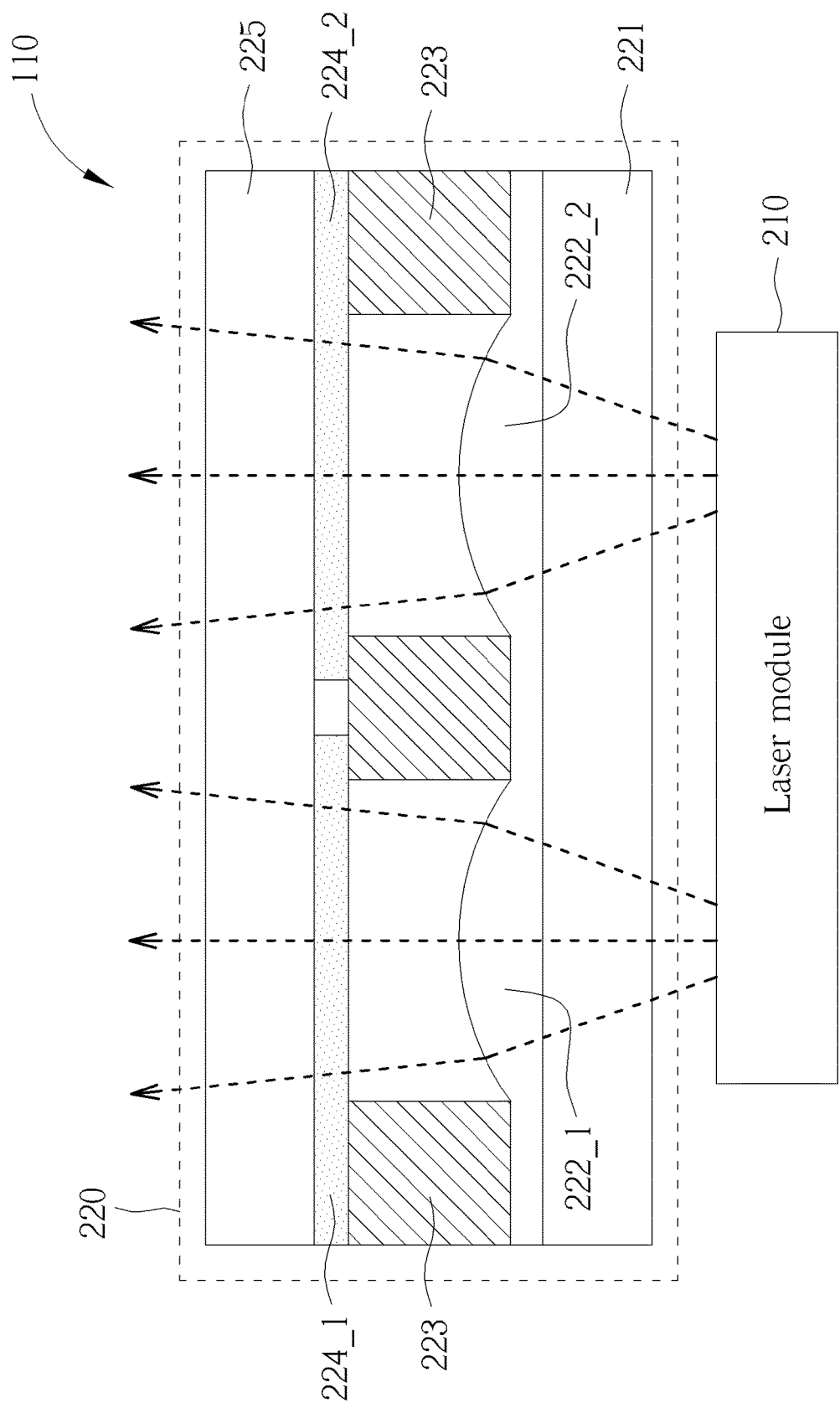
FIG. 2 is a diagram illustrating the projector according to one embodiment of the present invention.

FIG. 2 is a diagram illustrating the projector 110 according to one embodiment of the present invention. As shown in FIG. 2, the projector 110 comprises a laser module 210 and a lens module 220, where the lens module 220 comprises a substrate 221, two lens 222_1 and 222_2 imprinted on a surface of the substrate 221, a substrate 225, two diffractive optical elements (DOE) 224_1 and 224_2 imprinted on a surface of the substrate 225, and spacers 223. In this embodiment, the laser module 210 may be a package having at least one infrared laser diode for emitting one or two infrared laser beams (FIG. 2 shows two laser beams, not a limitation of the present invention), and one laser beam passes through the substrate 221, the lens 222_1, the DOE 224_1 and the substrate 225 to generates a first image having a pattern of the DOE 224_1, and the other laser beam passes through the substrate 221, the lens 222_2, the DOE 224_2 and the substrate 225 to generates a second image having a pattern of the DOE 224_2. It is noted that the first image or the second image can be simultaneously or sequentially generated, or only one of the first image and second image is generated according to the designer's consideration. For example, the when the first image and the second image are simultaneously or sequentially generated, the first image and the second image form the projected image 104 of the projector 110.

In one embodiment, the infrared laser diode may be edge emitting type, plasma laser diode or surface emitting type such as a vertical-cavity surface-emitting laser (VCSEL). In addition, the lenses 222_1 and 222_2 may have the same focal length or different focal lengths.

The arrangements of the layers shown in FIG. 2 are for illustrative purpose only, as long as the lens module 220 is capable of generating the first image and the second image, the lens module 220 may have different designs. For example, the lens 222_1 or 222_2 may be a biconvex lens, or another lens may be positioned above the lens 222_1 or 222_2, or the DOEs 224_1 and 224_2 may be imprinted on the upper surface of the substrate 225. In addition, the substrate 225 may have a single DOE layer, and the DOE 224_1 is a left portion of the DOE layer, and the DOE 224_2 is a right portion of the DOE layer. These alternative designs shall fall within the scope of the present invention.

Figure 3:
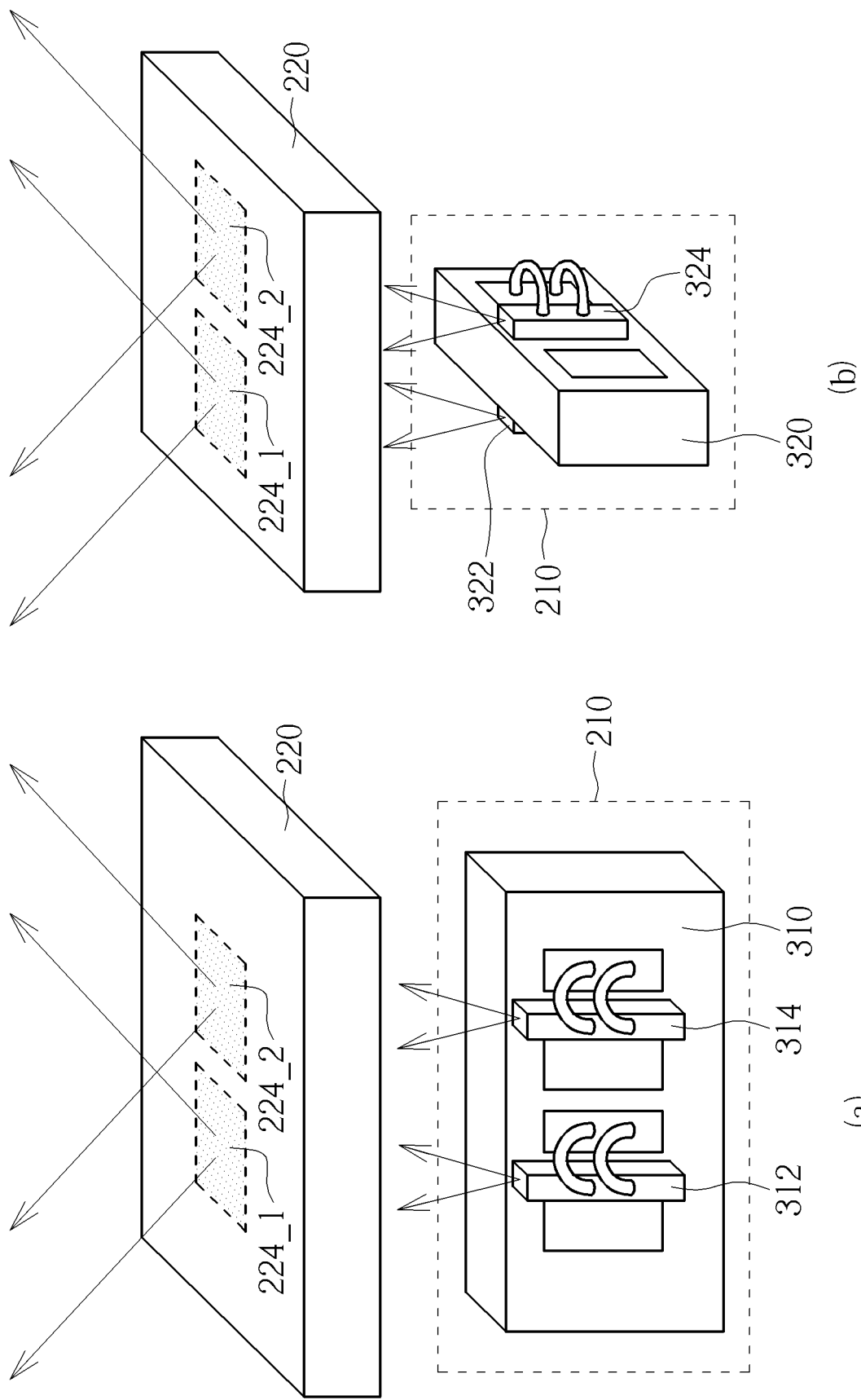
FIG. 3 shows the laser module according to the embodiments of the present invention.

FIG. 3 shows the laser module 210 according to the embodiments of the present invention. As shown in FIG. 3(a), the laser module 210 comprises a submount 310 and two laser diodes 312 and 314, wherein the laser diodes 312 and 314 are bonded on the same side plane of the submount 310. In this embodiment, the laser beam generated by the laser diode 312 passes through the DOE 224_1 of the lens module 220 to generate the first image, and the laser beam generated by the laser diode 314 passes through the DOE 224_2 of the lens module 220 to generate the second image. In the embodiment shown in FIG. 3(b), the laser module 210 comprises a submount 320 and two laser diodes 322 and 324, wherein the laser diodes 322 and 324 are bonded on the different side planes of the submount 320. The laser beam generated by the laser diode 322 passes through the DOE 224_1 of the lens module 220 to generate the first image, and the laser beam generated by the laser diode 324 passes through the DOE 224_2 of the lens module 220 to generate the second image. In the embodiments shown in FIG. 3, the first image and the second image are overlapped when they are projected on the object 102.

Figure 4:
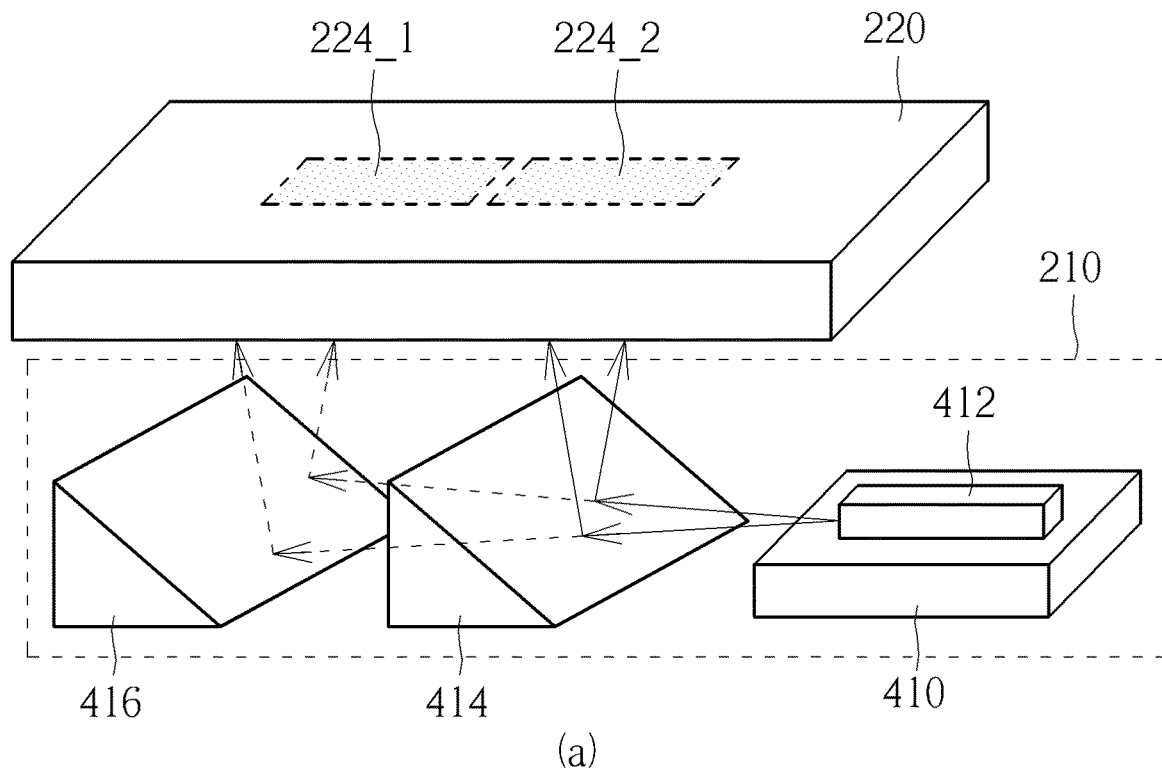
FIG. 4 shows the laser module according to other embodiments of the present invention.
Figure 4:
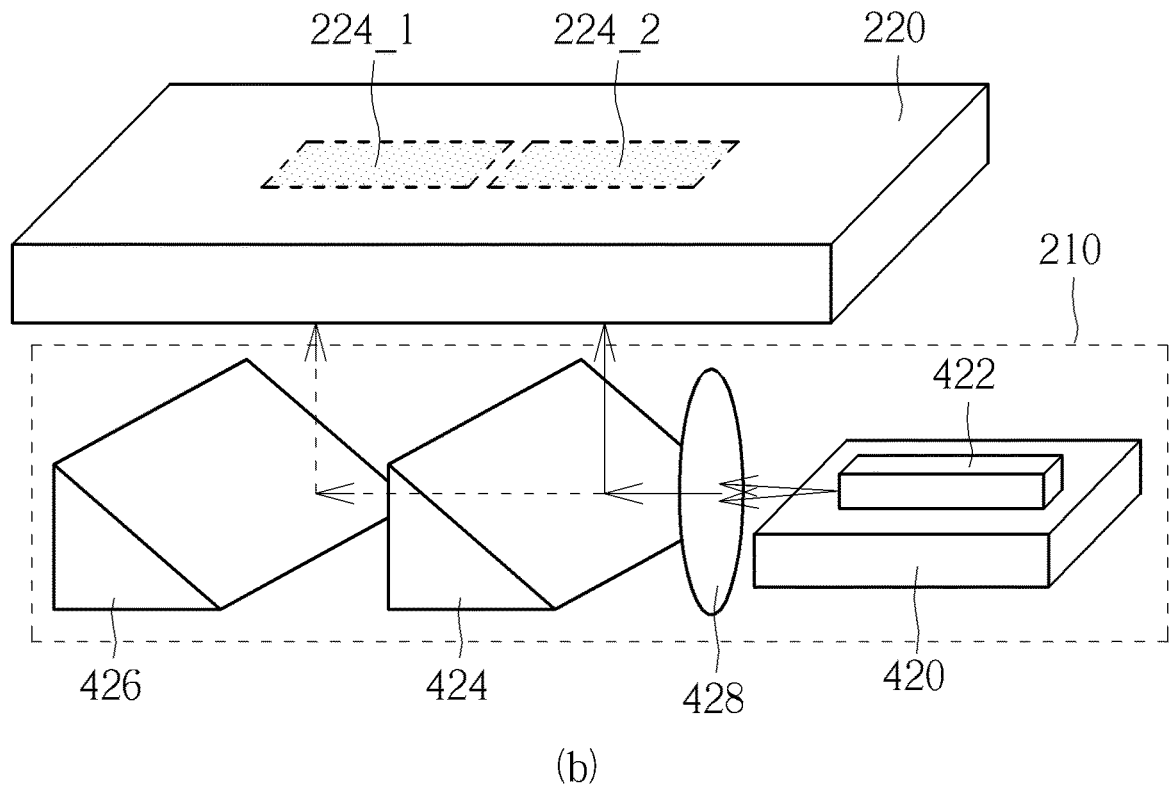

FIG. 4 shows the laser module 210 according to other embodiments of the present invention. As shown in FIG. 4(a), the laser module 120 comprises a submount 410, a laser diode 412 and two prisms 414 and 416, wherein a portion of a laser beam generated by the laser diode 412 is reflected by the prism 414, and another portion of the laser beam passes through the prism 414 and is reflected by the prism 416. The laser beam reflected by the prism 416 passes through the DOE 224_1 of the lens module 220 to generate the first image, and the laser beam reflected by the prism 414 passes through the DOE 224_2 of the lens module 220 to generate the second image. In the embodiment shown in FIG. 4(b), the laser module 120 comprises a submount 420, a laser diode 422, two prisms 424 and 426 and a lens 428, wherein a portion of a laser beam generated by the laser diode 422 passes through the lens 428 and is reflected by the prism 424, and another portion of the laser beam passes through the lens 428 and the prism 424 and is reflected by the prism 426. The laser beam reflected by the prism 426 passes through the DOE 224_1 of the lens module 220 to generate the first image, and the laser beam reflected by the prism 424 passes through the DOE 224_2 of the lens module 220 to generate the second image. In the embodiments shown in FIG. 4, the first image and the second image are overlapped when they are projected on the object 102.

Figure 5:
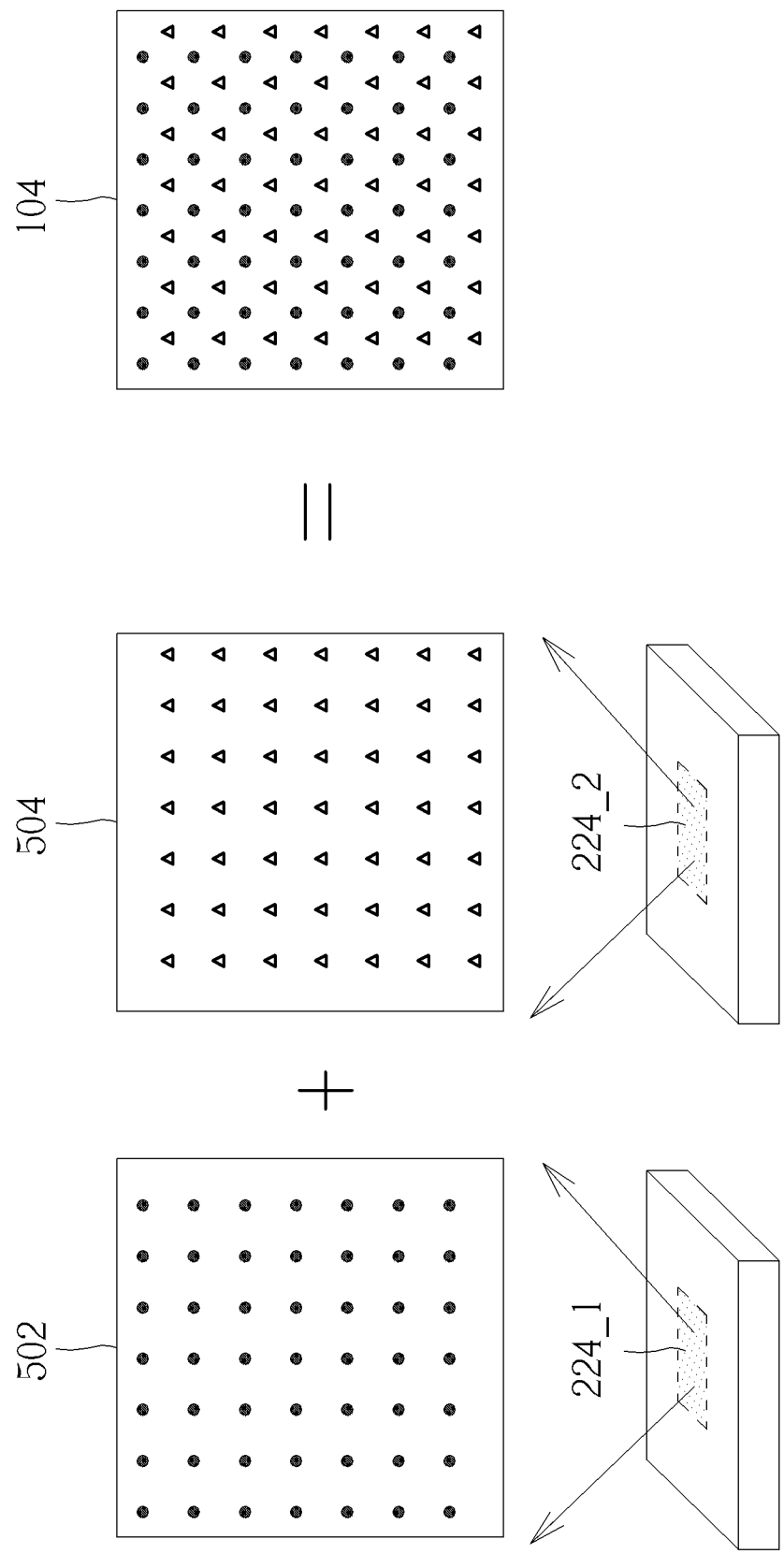
FIG. 5 shows generating the projected image according to one embodiment of the present invention.

FIG. 5 shows generating the projected image 104 according to one embodiment of the present invention. As shown in FIG. 5, one laser beam pass through the DOE 224_1 of the lens module 220 to generate the first image 502 to the object 102, and another laser beam pass through the DOE 224_2 of the lens module 220 to generate the first image 504 to the object 102, where each of the first image 502 and the second image 504 have a plurality of light spots. The positions of the first image 502 and the second image 504 can be carefully designed to make the projected image 104 including the first image 502 and the second image 504 have higher light spot density (i.e. high resolution) as shown in FIG. 5.

It is noted that the patterns shown in FIG. 5 are for illustrative purposes only, and they are not limitations of the present invention. For example, the patterns of the first image 502 and the second image 504 (i.e. the patterns of the DOE 224_1 and 224_2) may be the same or different, and the density/resolution of the first image 502 and the second image 504 may be the same or different. In addition, the embodiment shown in FIG. 5 shows that the whole areas the first image 502 and the second image are almost overlapped, however, the overlap ratio of the first image 502 and 504 may be designed according to engineer's consideration. For example, the projector 110 can be designed to make only the left portion of the first image 502 and the right portion of the second image 504 be overlapped. These alternative designs shall fall within the scope of the present invention.

Figure 6:
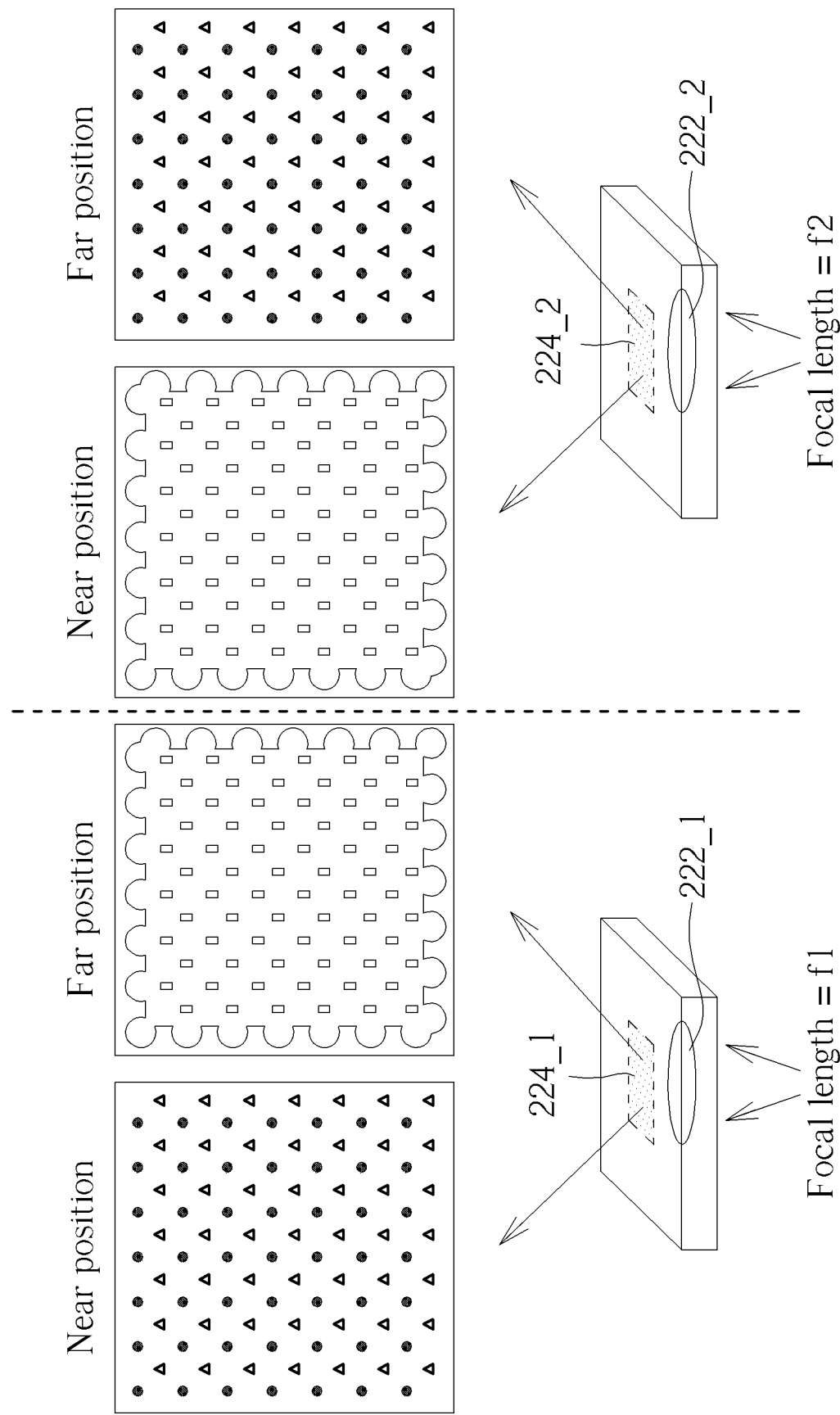
FIG. 6 shows the use of the projector when the lenses are designed to have different focal lengths according to one embodiment of the present invention.

FIG. 6 shows the use of the projector 110 when the lenses 222_1 and 222_2 are designed to have different focal lengths according to one embodiment of the present invention. As shown in FIG. 6, the lens 222_1 has the focal length f1, and the lens 222_2 has the focal length f2, for example, f1 may be 0.2 meter while f2 is equal to 0.5 meter. In this embodiment, when the object 102 is close to the projector 110 (e.g. 0.15 meters), the first image outputted by the DOE 224_1 may be clear, and when the object 102 is far from the projector 110 (e.g. 0.75 meters), the first image outputted by the DOE 224_1 may be blurry. On the other hand, when the object 102 is close to the projector 110, the second image outputted by the DOE 224_2 may be blurry, and when the object 102 is far from the projector 110, the first image outputted by the DOE 224_2 may be clear. Therefore, since each of the lenses 222_1 and 222_2 has its corresponding working distance, the electronic device 100 can select one of the second image and the second image having clear patterns, and analyze the selected one to obtain the depth information of the projected image 104.

Regarding the control of the projector 110 shown in FIG. 6, the first image and the second image may be sequentially generated to the object 102, and the camera module 120 captures the image data corresponding to the first image and the second image, respectively, and the processor 130 determines which one of the first image and the second image is more clear, and the processor 130 selects and analyzes the clear one to obtain the depth information of the projected image. In other embodiments, the electronic device 100 may use other elements or methods capable of measuring the distance between the electronic device 100 and the object 102, and the controller 140 controls the projector 110 to generate the image corresponding to the lens whose focal length is closer to the measured distance. Taking FIG. 3(a)

and FIG. 6 as an example, if the electronic device 100 determines that the distance between the electronic device 100 and the object 102 is small, the controller 140 may control the projector 110 to turn on the laser diode 312 to generate the laser beam to the lens 222_1 and the DOE 224_1 to generate the first image, meanwhile the laser diode 314 is turned off. If the electronic device 100 determines that the distance between the electronic device 100 and the object 102 is great, the controller 140 may control the projector 110 to turn on the laser diode 314 to generate the laser beam to the lens 222_2 and the DOE 224_2 to generate the second image, meanwhile the laser diode 312 is turned off.

Figure 7:
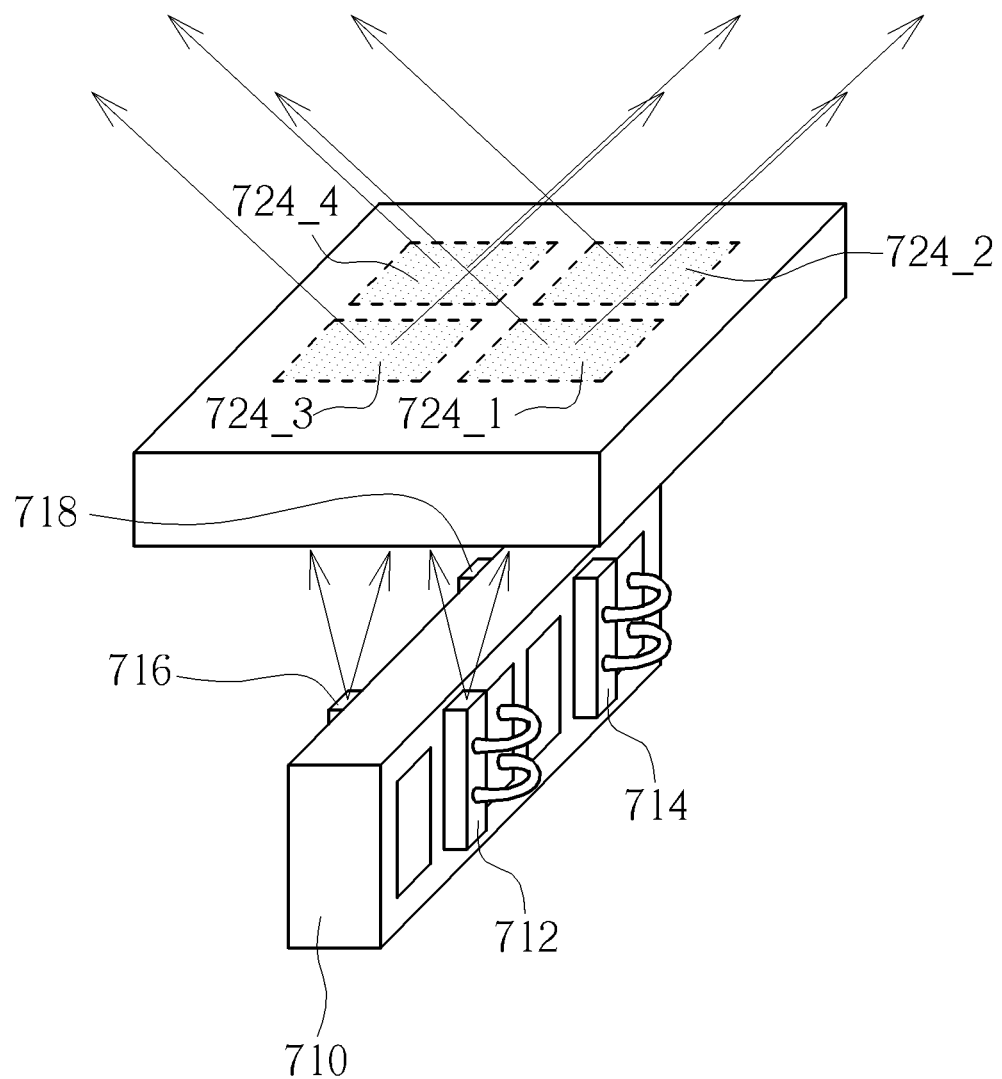
FIG. 7 shows a laser module and a lens module according to another embodiment of the present invention.

The embodiments 110 shown in FIGS. 2-6 only show two lenses 222_1 and 222_2 and two DOEs 224_1 and 224_2, however, the quantity of the lenses and the DOEs may be more than two (e.g. 1*N array, M*1 array, M*N array, where M and N are any suitable integers). FIG. 7 shows a laser module comprising a submount 710 having four laser diodes 712, 714, 716 and 718 bonded thereon, and a lens module comprising four DOEs 724_1-724_4. In the embodiment shown in FIG. 7, the laser diode 712 is arranged to generate a laser beam to the DOE 724_1 to generate a first image, the laser diode 714 is arranged to generate a laser beam to the DOE 724_2 to generate a second image, the laser diode 716 is arranged to generate a laser beam to the DOE 724_3 to generate a third image, and the laser diode 718 is arranged to generate a laser beam to the DOE 724_4 to generate a fourth image. In the embodiment shown in FIG. 7, the laser diodes 712, 714, 716 and 718 can be simultaneously turned on or sequentially turned on, or only a portion of the laser diodes 712, 714, 716 and 718 is/are turned on according to a working distance. Because a person skilled in the art should understand the operations and applications of the embodiment shown in FIG. 7 after reading the aforementioned embodiments, further descriptions are omitted here.

Figure 8:
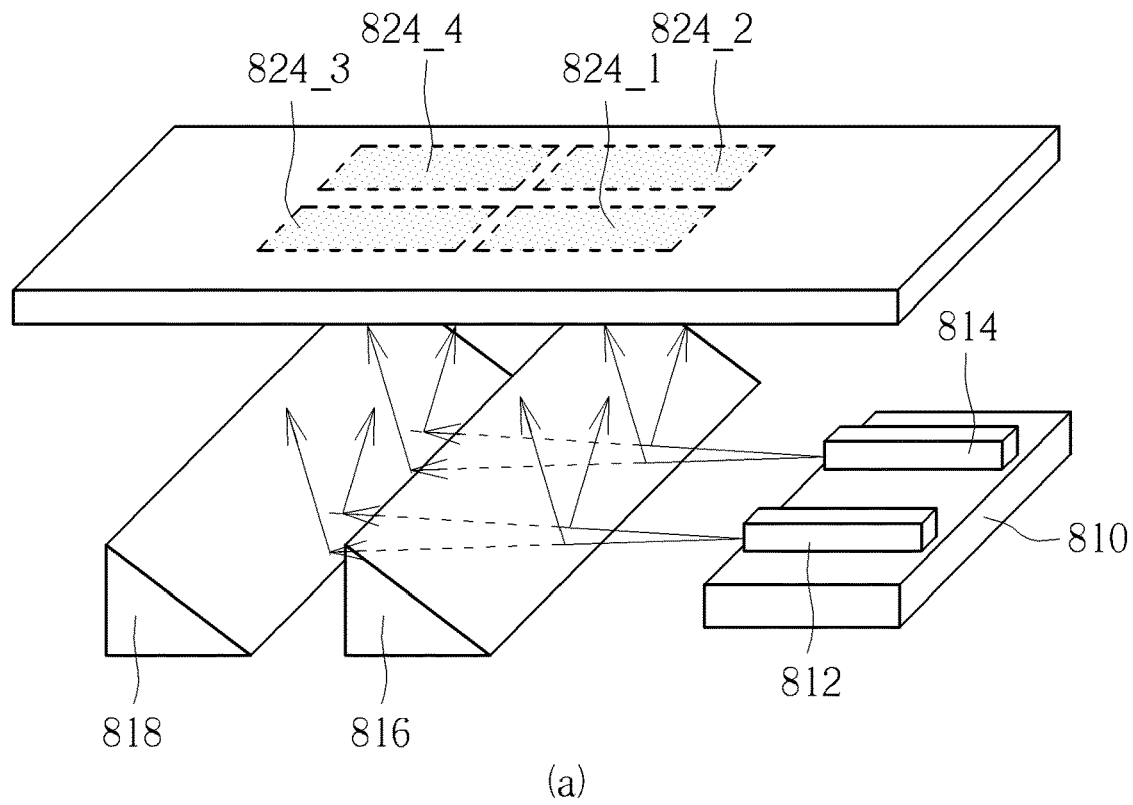
FIG. 8 shows the laser module shown in FIG. 7 according to one embodiment of the present invention.
Figure 8:
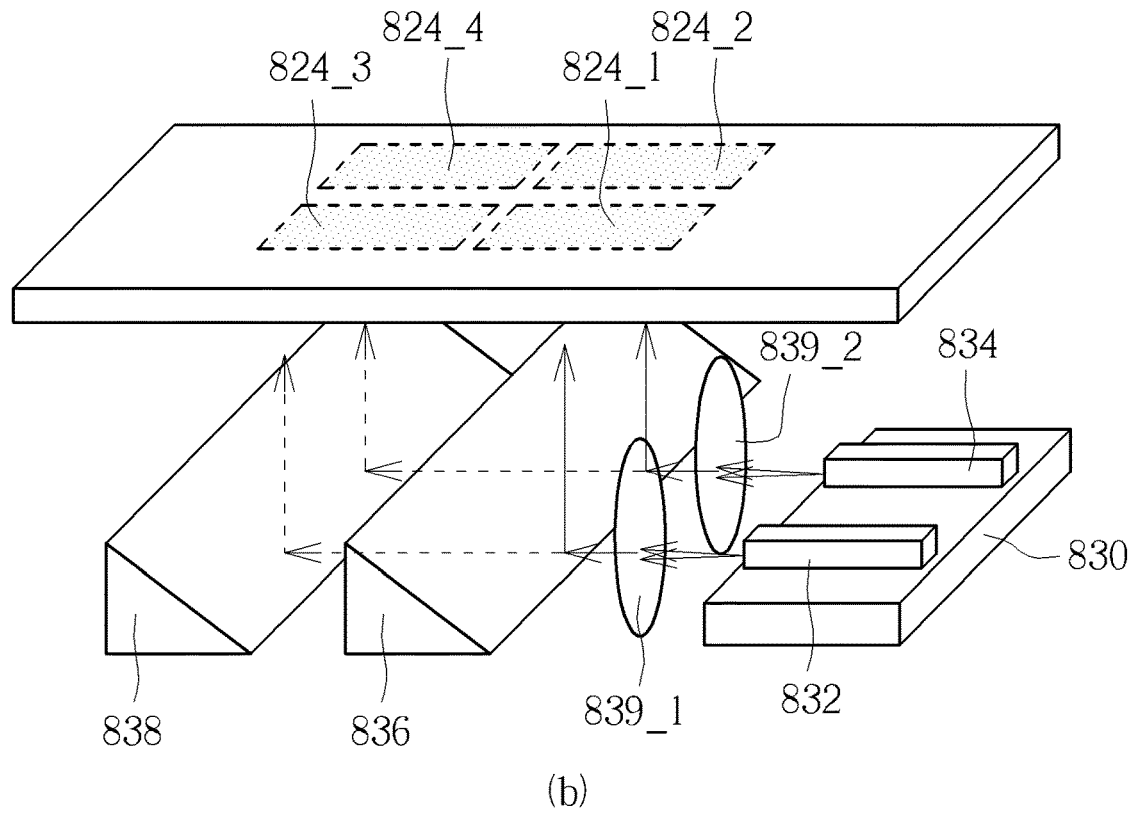

FIG. 8 shows the laser module shown in FIG. 7 according to one embodiment of the present invention. As shown in FIG. 8(a), the laser module comprises a submount 810, two laser diodes 812 and 814, and two prisms 816 and 818, wherein a portion of a laser beam generated by the laser diode 812 is reflected by the prism 816, and another portion of the laser beam passes through the prism 816 and is reflected by the prism 818; a portion of a laser beam generated by the laser diode 814 is reflected by the prism 816, and another portion of the laser beam passes through the prism 816 and is reflected by the prism 818. The laser beam generate by the laser diode 812 and reflected by the prism 816 passes through the DOE 824_1 of the lens module to generate the first image, the laser beam generate by the laser diode 814 and reflected by the prism 816 passes through the DOE 824_2 of the lens module to generate the second image, the laser beam generated by the laser diode 812 and reflected by the prism 818 passes through the DOE 824_3 of the lens module to generate the third image, and the laser beam generated by the laser diode 814 and reflected by the prism 818 passes through the DOE 824_4 of the lens module to generate the fourth image. In the embodiment shown in FIG. 8(b), the laser module comprises a submount 830, two laser diodes 832 and 834, two prisms 836 and 838, and two lenses 839_1 and 839_2, wherein a portion of a laser beam generated by the laser diode 832 passes through the lens 839_1 and is reflected by the prism 836, and another portion of the laser beam passes through the lens 839_1 and the prism 836 and is reflected by the prism 838; a portion of a laser beam generated by the laser diode 834 passes through the lens 839_2 and is reflected by the prism 836, and another portion of the laser beam passes through the lens 839_2 and the prism 836 and is reflected by the prism 838. The laser beam generate by the laser diode 832 and reflected by the prism 836 passes through the DOE 824_1 of the lens module to generate the first image, the laser beam generate by the laser diode 834 and reflected by the prism 836 passes through the DOE 824_2 of the lens module to generate the second image, the laser beam generated by the laser diode 832 and reflected by the prism 838 passes through the DOE 824_3 of the lens module to generate the third image, and the laser beam generated by the laser diode 834 and reflected by the prism 838 passes through the DOE 824_4 of the lens module to generate the fourth image.

Briefly summarized, in the projector of the present invention, the projector is capable of generating a plurality of images, and the images may be generated simultaneously or sequentially to obtain the projected image with higher density/resolution and/or FOV, or only part of the images is/are generated based on a distance of the projector and the object to obtain the clearer projected image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector, comprising:
    a laser module, for generating at least one laser beam;
    a lens module, comprising:
        a plurality of lenses, wherein each of the lenses is arranged to receive one of the at least one laser beam to generate a collimated laser beam; and
        a plurality of diffractive optical elements, wherein the diffractive optical elements correspond to the lenses, respectively, and each of the diffractive optical elements is arranged to receive the collimated laser beam from the corresponding lens to generate an image;
    wherein the laser module comprises a plurality of laser diodes, the laser diodes are arranged to generate a plurality laser beams to the lenses, respectively, the laser diodes are simultaneously or sequentially turned on to generate the laser beams to the lenses and the diffractive optical elements to generate the images, respectively; and at least two of the lenses have different focal lengths.

2. The projector of claim 1, wherein quantity of the laser diodes, quantity of lenses and quantity of the diffractive optical elements are the same.

3. The projector of claim 1, wherein at least a portion of the images are overlapped.

4. The projector of claim 3, wherein each of the images has a plurality of light spots, the images form a projected image of the projector, and a light spot density of the projected image is greater than that of each of the images.

5. The projector of claim 1, wherein only one of the laser diodes is turned on to generate the laser beam to the corresponding lens and diffractive optical element to generate the image.

6. The projector of claim 5, wherein at least two of the diffractive optical elements have different patterns.

7. The projector of claim 1, wherein the laser module comprises at least one laser diode, the at least one laser diode is arranged to generate a plurality laser beams to the lenses.

8. The projector of claim 7, wherein quantity of the laser diodes is less than quantity of lenses or quantity of the diffractive optical elements.

9. The projector of claim 7, wherein the at least one laser diode is arranged to generate the laser beams to the lenses by using at least one prism.

10. An electronic device, comprising:
a projector, comprising:
  a laser module, for generating at least one laser beam;
  a lens module, comprising:
    a plurality of lenses, wherein each of the lenses is arranged to receive one of the at least one laser beam to generate a collimated laser beam; and
    a plurality of diffractive optical elements, wherein the diffractive optical elements correspond to the lenses, respectively, and each of the diffractive optical elements is arranged to receive the collimated laser beam from the corresponding lens to generate an image to a surrounding environment; and
a camera module, for capturing the region of the surrounding environment to generate image data; and
a processor, for analyzing the image data to obtain depth information of the image data;
wherein the laser module comprises a plurality of laser diodes, the laser diodes are arranged to generate a plurality laser beams to the lenses, respectively, and at least two of the lenses have different focal lengths.

11. The electronic device of claim 10, wherein laser diodes are simultaneously or sequentially turned on to generate the laser beams to the lenses and the diffractive optical elements to generate the images, respectively, and at least a portion of the images are overlapped.

12. The electronic device of claim 11, wherein each of the images has a plurality of light spots, the images form a projected image of the projector, and a light spot density of the projected image is greater than that of each of the images.

13. The electronic device of claim 10, wherein only one of the laser diodes is turned on to generate the laser beam to the corresponding lens and diffractive optical element to generate the image.

14. The electronic device of claim 10, wherein the processor further analyzes the image data to determine if switching the laser diode to generate another image to the surrounding environment by using another laser diode and the corresponding lens and diffractive optical element; and if the laser diode is switched and the projector generates the another image, the camera module further captures the region of the surrounding environment to generate image data of the another image, and the processor analyzes the image data of the another image to obtain depth information of the image data.

* * * * *